July 19, 1960 F. T. NIELSSON 2,945,747
APPARATUS FOR THE GRANULATION OF FERTILIZERS
Filed June 17, 1958 3 Sheets-Sheet 1
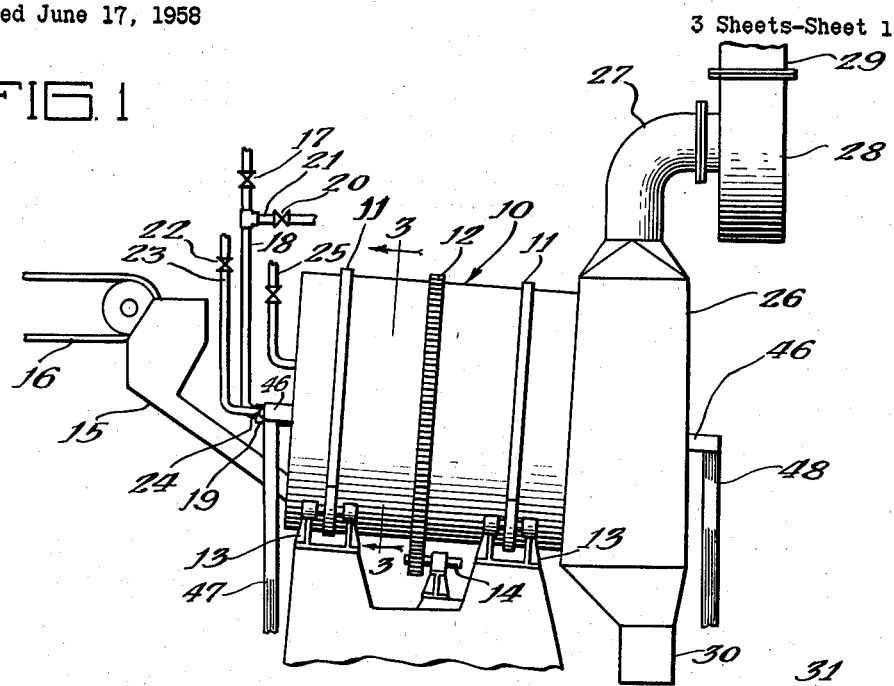
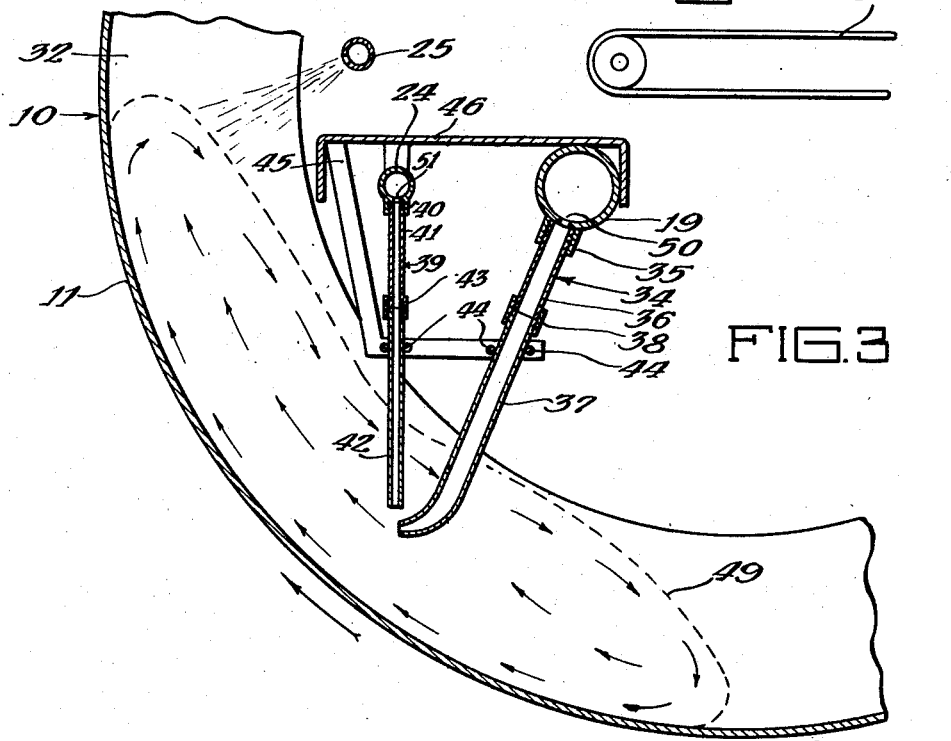
Inventor:
Francis T. Nielsson
By Ernest V. Haines
Attorney July 19, 1960  F. T. NIELSSON  2,945,747
APPARATUS FOR THE GRANULATION OF FERTILIZERS
Filed June 17, 1958  3 Sheets-Sheet 2

Inventor:
Francis T Nielsson
By Ernest V. Haines
Attorney

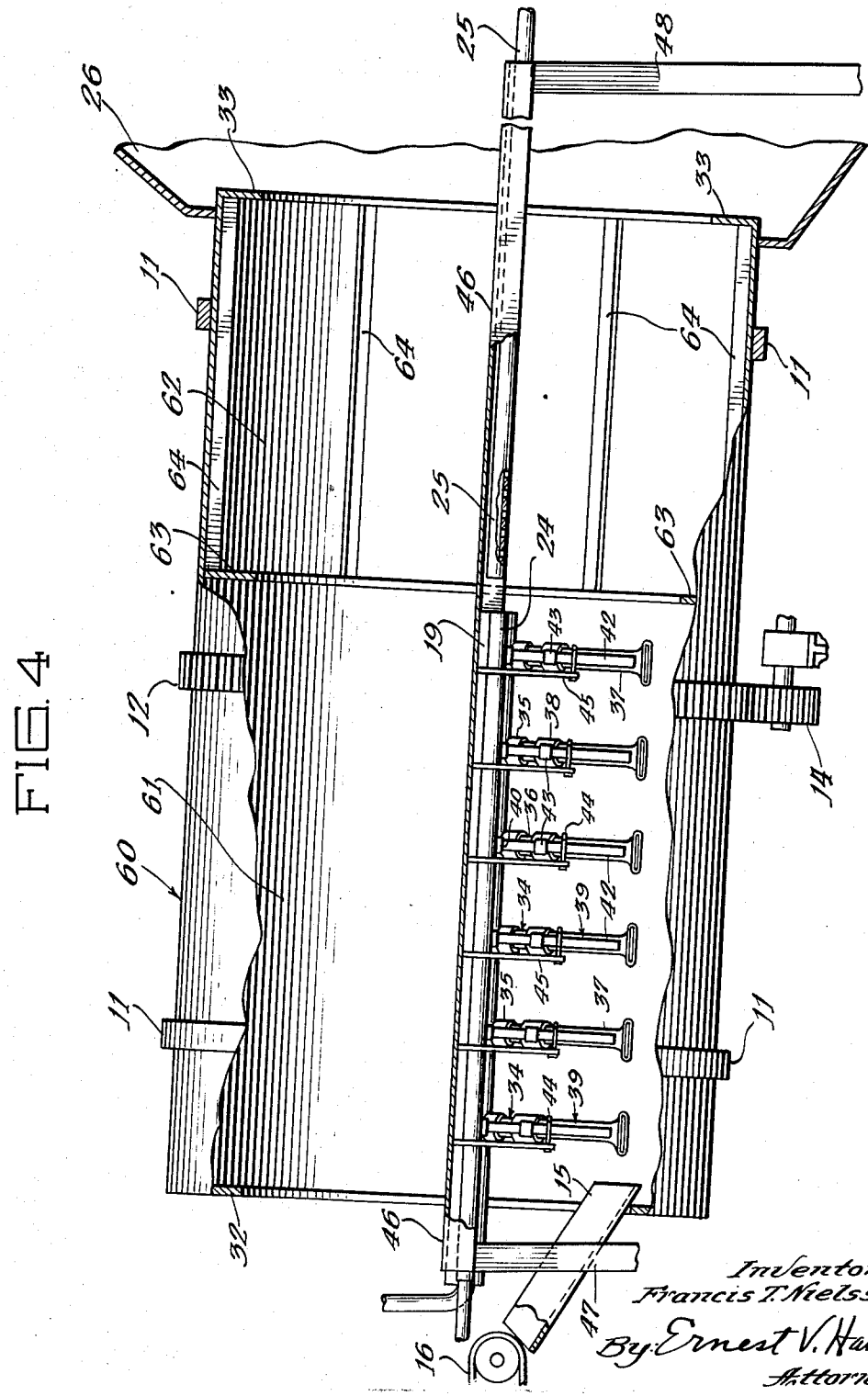

United States Patent Office 2,945,747
Patented July 19, 1960

2,945,747

APPARATUS FOR THE GRANULATION OF FERTILIZERS

Francis T. Nielsson, Morton Grove, Ill., assignor to International Minerals & Chemical Corporation, a corporation of New York Filed June 17, 1958, Ser. No. 742,635

9 Claims. (Cl. 23—259.1)

This invention relates to an apparatus for the preparation of granular fertilizers. More particularly, it relates to a rotating granulator or ammoniator provided with novel means for introducing gaseous and liquid reactants beneath a bed of rolling fertilizer solids therein.

Numerous processes have been developed for the preparation of granular mixed fertilizer where an ammonium salt such as ammonium sulfate is formed in situ by reacting an ammonia-containing substance and sulfuric acid in the presence of solid fertilizer components. Generally, acid and ammonia-containing solutions are sprayed on the surface of a tumbling bed of solid fertilizer components such as superphosphate, potassium chloride, and the like. In a process of this type a substantial amount of ammonia may be volatilized and lost in the atmosphere. In addition, uniform ammoniation of the solid fertilizer components is not readily obtained.

In U.S. Patent No. 2,741,545, F. T. Nielsson, issued April 10, 1956, an apparatus is described for ammoniation of superphosphate, wherein ammonia is fed into a manifold pipe positioned along the central axis of a rotating drum. Communicating with each end of the manifold are supply tubes which convey ammonia to a distributor pipe positioned adjacent to the wall of the drum and parallel to the central axis of the drum. The distributor pipe is provided with a plurality of holes positioned along its length. Ammonia is discharged through the holes beneath the surface of the bed of tumbling solids. The drum may also be provided with an acid distributor pipe positioned below the surface of the bed and adjacent to the ammonia distributor. It is asserted that there is very little loss of ammonia to the atmosphere in apparatus of this type.

However, this type of ammoniation apparatus has several disadvantages. Because of the corrosive conditions resulting from the addition of strong acid and ammonia, the distributors are rapidly corroded. Replacement of the corroded distributors is time consuming and expensive. In addition, corrosion causes enlargement of the orifices in the distributors, thereby resulting in an uncontrolled variation in the distribution of acid and/or ammonia in the tumbling bed of solids. When the orifices are greatly enlarged by corrosion, pools of acid and ammonia solution may form in the granulator, which tend to cause poor granulation and create unsafe temperature conditions. Therefore, when one portion of the distributor is corroded excessively, the entire distributor must be replaced. Furthermore, since the pipe distributors are positioned beneath the surface of the tumbling bed, parallel to the central axis and adjacent to the wall of the granulator, the pipe distributors interfere with the rolling action of the bed of solid materials. As a result the uniformity of particle size of granules produced in the ammoniator is adversely affected.

It is a primary object of the invention to overcome the disadvantages and shortcomings of rotating ammoniators used heretofore.

It is another object of this invention to provide an improved apparatus for distributing liquid and gaseous materials beneath the surface of a tumbling bed of solid fertilizer components.

It is another object of this invention to provide an apparatus for preparing granular ammonia-containing fertilizer materials wherein the cost of replacing corroded parts is substantially reduced.

Still another object of this invention is to provide an apparatus for preparing granular ammonia-containing fertilizer materials, wherein the acid and ammonia distributors positioned below the surface of the tumbling bed of fertilizer solids do not substantially inhibit the rolling action of the solids in the bed.

These and other objects of the invention will become apparent from the following detailed description of the invention.

The novel apparatus comprises in combination an inclined rotary cylindrical drum, two retaining rings positioned at each end of the drum; an ammonia distributing member having a length slightly less than the distance between the two retaining rings and comprised of a manifold extending parallel to the longitudinal axis of the drum, said manifold communicating with a plurality of parallel conduits which extend downwardly from the manifold and terminate at a point adjacent to the inner wall of the drum; an acid distributing member similarly constructed and positioned; and means for removing gaseous reaction products from the drum.

The term "ammonia" as used throughout the description and claims is intended to include both liquid and gaseous anhydrous ammonia, aqueous ammonia solutions, and aqueous solutions of ammonia and other nitrogen containing compounds. A typical chemical analysis of a suitable ammoniating solution is as follows:

| Component: | Proportion, percent |
|---|---|
| $NH_3$ | 25 |
| $NH_4NO_3$ | 55 |
| Urea | 10 |
| $H_2O$ | 10 |
| Total nitrogen | 44.4 |

It will be recognized that this is merely a typical analysis, and that other ammoniating solutions may be used. The term "acid" as used throughout the description and claims is intended to include aqueous solutions of sulfuric acid, phosphoric acid, or mixtures thereof. Sulfuric acid solutions of between about 60 and about 66° Bé. are preferably used, but other sulfuric acid solutions may be used if desired. Phosphoric acid may be either "furnace acid" or "wet process acid." It is preferred to use a phosphoric acid solution having a $P_2O_5$ concentration between about 45 and about 55% by weight, but other concentrations may be used if desired.

Figure 1 is an elevational view of one form of the novel granulator.

Figure 3 is a sectional view taken along the lines 3—3 of Figure 1.

Figure 4 is a fragmentary elevational view of a preferred form of the novel granulator.

Figure 2:
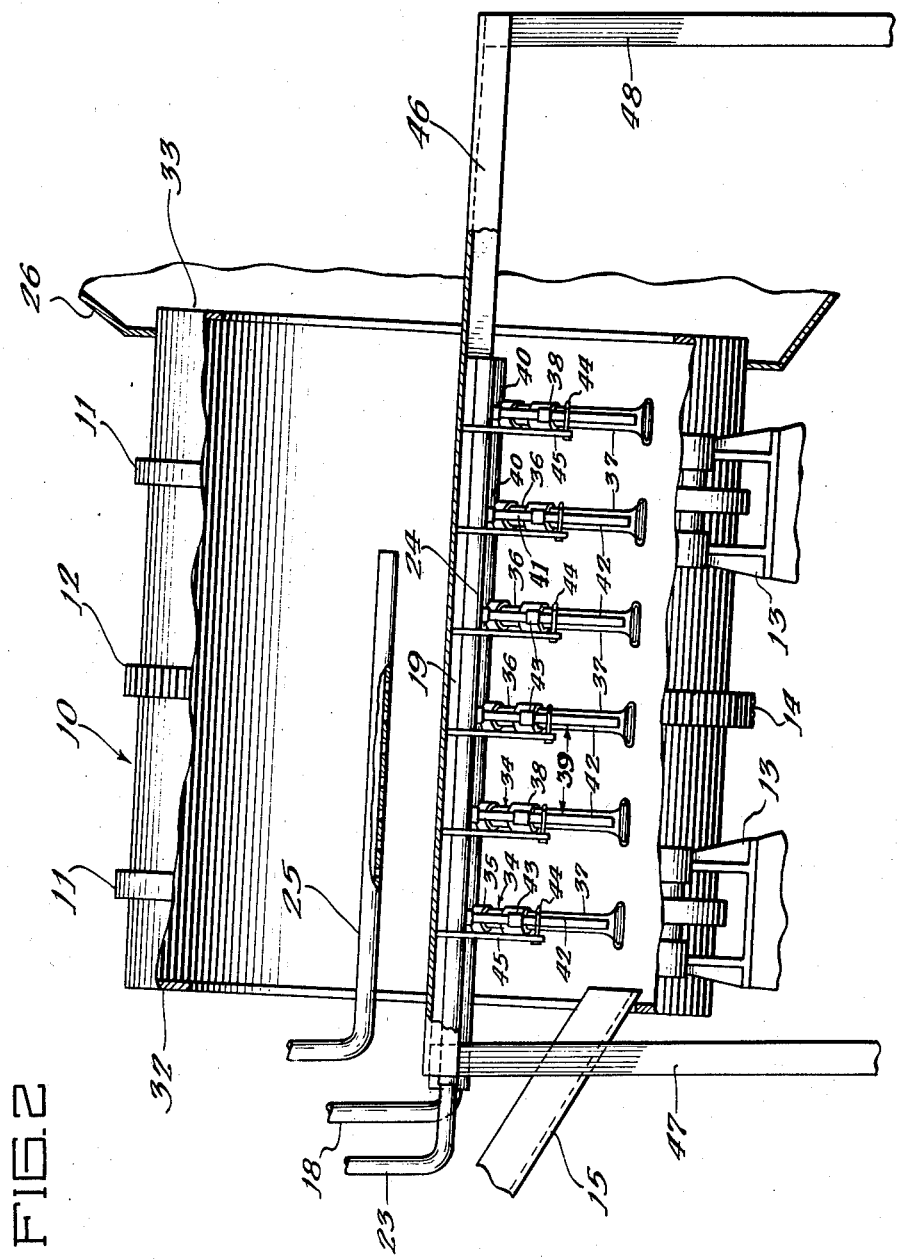
Figure 2 is a fragmentary elevational view of the novel granulator.

Referring to Figure 1, rotary drum 10, having open ends, is fitted with tires 11 and spur gear 12. Drum 10 is mounted on trunnions 13 and driven through gear 14 by a motor (not shown). Feed chute 15 is adapted to receive and convey solid fertilizer components from conveyor 16 to the feed end of drum 10. Solid fertilizer components such as superphosphate, triple superphosphate, potassium chloride, langbeinite, ammonium sulfate and the like, are fed from individual weighing hoppers into a blending apparatus such as a screw conveyor, which discharges the solid mixture onto feed conveyor 16. The storage hoppers, weighing apparatus, and screw conveyor are not shown.

An ammonia-containing fluid from a source not shown is conveyed through control valve 17 and conduit 18 to ammonia manifold 19 mounted within drum 10. Another ammonia-containing fluid or water from a source not shown may be fed if desired through control valve 20 and conduit 21 into conduit 18.

An aqueous acidic solution from a source not shown is conveyed through control valve 22 and conduit 23 to acid manifold 24. Water for cooling purposes may be introduced through valved line 25. The portion of line 25 in the drum is perforated on the underside in order to direct a spray of water onto the material in the drum. A suitable means of passing a current of air through the drum is illustrated as hood 26, duct 27, and fan 28. Any other suitable means such as a stream jet ejector positioned at the discharge end of drum 10, or a blower type fan positioned at the feed end of drum 10 may be used. It is necessary that some means be provided for continuously removing gases and vapors from the drum, the type of equipment being immaterial to the present invention.

Hood 26 is positioned at the discharge end of drum 10 and communicates with duct 27, fan 28, and stack 29. Fan 28 induces air to flow through drum 10, hood 26, and duct 27 to fan 28. Air admixed with moisture and fumes is discharged through stack 29 to a water scrubber (not shown) or to the atmosphere. Granular fertilizer passes from the discharge end of drum 10 to the lower portion of hood 26, where it is discharged through solids outlet 30 to conveyor 31. Granular solids may be conveyed by conveyor 31 either to a dryer or to screens. If the moisture content of the solids is above about 2%, the solids may be conveyed to a conventional rotary dryer (not shown) to reduce the moisture content to within the desired range, and then to a conventional cooler (not shown). Granular solids discharged from conveyor 31 or from the cooler, as the case may be, may be screened to separate a coarse fraction, a middling or product fraction having the desired size, for example, −6+20 mesh, and a fine fraction. The coarse fraction may be comminuted and recycled to the screens. The fine fraction may be recycled to feed chute 15.

Figure 2 is a fragmentary elevational view of drum 10 showing feed chute 15 adapted to receive and convey solid fertilizer components into the drum. Retaining annulus ring 32 and annular discharge weir or retaining ring 33 are positioned at the feed end and discharge end of the drum, respectively. The size of retaining rings 32 and 33 is sufficient to maintain a bed of solids of substantial depth in the drum.

Ammonia manifold 19 is disposed above the bed of solids, parallel and adjacent to the longitudinal axis of the drum. Depending from ammonia manifold 19 and perpendicular thereto are a plurality of ammonia supply conduits 34, positioned parallel to each other at equidistant points along the length of the manifold. Each ammonia supply conduit 34 is comprised of a flange 35 communicating with and secured at one end to ammonia manifold 19 and at the other end to upper conduit section 36, the latter communicating with lower conduit section 37 by means of coupling 38. The discharge end of lower conduit section 37 is positioned below the bed of solids and is preferably flattened into the form of a "fish tail" in order to distribute ammonia more uniformly in the spaces between lower conduit sections 37. Ammonia is discharged from each lower conduit section in substantially the same direction as the direction of rotation of the drum.

Acid manifold 24 is disposed above the bed of solids parallel and adjacent to the ammonia manifold 19. Depending from acid manifold 24 and perpendicular thereto are a plurality of acid supply conduits 39 positioned parallel to each other at equidistant points along the length of the acid manifold. Each acid supply conduit is comprised of a flange 40 communicating with and secured at one end to acid manifold 24 and at the other end to upper conduit section 41, the latter communicating with lower conduit section 42 by means of coupling 43. The discharge end of lower conduit section 42 is positioned beneath the bed of solids, above and adjacent to the discharge end of the lower conduit section 37 of the ammonia distributing unit.

Each ammonia supply conduit 34 is preferably positioned adjacent to an acid supply conduit 39, the center lines of each pair of conduits being positioned in a plane perpendicular to the longitudinal axis of the drum. The distance between the center lines of one pair of conduits and an adjacent pair of conduits is preferably between about 9 and about 12 inches, but may be between about 4 and about 14 inches if desired. Ammonia supply conduits 34 and acid supply conduits 39 are secured by means of clamps 44 to support brackets 45. Support brackets 45 are secured as by welding to distributor support member 46, which is positioned parallel to the longitudinal axis of the drum. Support member 46 is any suitable channel, beam, or the like, secured at one end to A frame 47 and at the other end to A frame 48.

Figure 3 is a sectional elevational view taken along lines 3—3 of Figure 1. The approximate position of the bed of solids in rotating drum 10 is shown by dotted line 49, and the arrows show the approximate path of the granular solids in the tumbling bed. Solids are prevented from discharging from the feed end of the drum by means of retaining ring 32. Water line 25, provided with holes in the underside, may be used to spray water on to the bed of solids if cooling is desired.

Distributor support member 46 extends through the drum and is secured at each end to A frames (not shown in Figure 3). Support brackets 45 of any convenient design and material are secured as by welding at one end to distributor support member 46. The lower portion of support brackets 45 is secured to ammonia supply conduits 34 and acid supply conduits 39 by means of clamps 44.

Ammonia manifold 19 is provided with a series of holes 50 extending in a straight line on the underside of the manifold, each hole 50 communicating with an ammonia supply conduit 34. The diameter of the holes 50 is varied, the holes with the smallest diameter being at each end portion of the ammonia manifold, and holes with the largest diameter being in the center portion of the manifold. For example, when there are six ammonia supply conduits 34 secured to ammonia manifold 19, the diameter of the hole nearest the feed end may be about ¼″, the diameter of the next hole may be about ⁵⁄₁₆″, the diameter of each of the next two holes may be about ⅜″, the diameter of the next hole may be about ⁵⁄₁₆″, and the diameter of the last hole may be about ¼″. Ammonia supply conduits 34 are preferably positioned at an angle of between about 30° and about 60° from a vertical diameter of drum 10 in the direction of rotation of the drum. However, any convenient angle may be used as long as the discharge end of each lower conduit section 37 is positioned beneath the bed of soilds at a point substantially equidistant between the top and bottom of the bed, and ammonia is distributed in substantially the same direction as the direction of rotation of the drum.

Acid manifold 24 is provided with a series of holes 51, extending in a straight line on the underside of the manifold, each hole communicating with an acid supply conduit 39. The diameter of holes 51 gradually increases from the feed end of drum 10 to the discharge end. For example, when there are six acid supply conduits 39 secured to acid manifold 24, the diameter of the two holes nearest the feed end of the drum may be about ⅛", the diameter of the next two holes may be about ¼", and the diameter of the last two holes may be about ⁵⁄₁₆". While examples of the diameters of holes in ammonia manifold 19 and acid manifold 24 have been given, it will be recognized that the diameter of these holes may be varied, depending upon the capacity of the rotating drum and the type of fertilizer being prepared. However, the diameter of the holes in the ammonia manifold 19 should permit maximum release of ammonia in the central portion of the ammonia manifold, and the diameter of the holes 51 in the acid manifold 24 should permit maximum release of acid at the end of the acid manifold furtherest from the feed end of the drum. When ammonia and acid are distributed beneath the bed of solids in this manner, ammonia losses are minimized and the resulting granular solids are more uniform with respect to particle size and ammoniation.

The total area of all holes 50 in ammonia manifold 19 should preferably be less than one-half of the cross-sectional area of the manifold in order to maintain a flow of fluid in each hole proportionate to its area. The total area of holes 51 should preferably be proportioned in the same manner with respect to acid manifold 24.

Acid supply conduits 39 are preferably positioned in a vertical plane parallel to the central axis of the drum. However, any convenient position may be used as long as the acid manifold 24 is positioned above the bed of solids, and the discharge end of each lower conduit section 42 is below the surface of the bed of solids. Preferably, the discharge end of each lower conduit section 42 is positioned adjacent to the discharge end of a lower conduit section 37, for example, about 1" above the discharge end of a lower conduit section 37.

The dimensions of ammonia supply conduits 34 and acid supply conduits 39 will vary with the size of the drum. However, in a drum having a diameter of 6 feet, satisfactory results are obtained using ammonia supply conduits 34 having an overall length of about 28" and acid supply conduits 39 having an overall length of about 21".

Ammonia manifold 19, acid manifold 24, flanges 35 and 40, upper conduit sections 36 and 41, and couplings 38 and 43 are preferably constructed of a corrosion resistant material such as stainless steel of the 300 series. These components are positioned in the drum in the vapor space above the bed of solids. There is little or no corrosion of these components and as a result, maintenance of these components is negligible.

Lower conduit sections 37 and 42 may be fabricated from mild steel, preferably having the designation "double extra heavy black iron pipe." Since the discharge ends of lower conduit sections 37 and 42 are positioned below the surface of the bed of solids, these components are readily corroded. However, the rate of corrosion is not uniform, and the lower conduit sections near the feed end of the drum may last for 30 days while those furtherest from the feed end may corrode after about 7 days of operation. Thus, when one of the lower conduit sections 37 or 42 becomes corroded, it is disconnected from coupling 38 or 43 and clamps 44, and replaced with a new lower conduit section 37 or 42, as the case may be. However, when a longitudinal distributor of the prior art type is positioned beneath the bed of solids and becomes corroded at one point, generally after about 7 days of operation, it is necessary to replace the entire distributor, since corrosion of the orifices in this type of distributor causes excessive ammonia or acid to flow into the bed. In contrast to this, corrosion of the lower conduit sections 37 and 42 of the novel apparatus cannot permit excessive acid or ammonia to flow into the bed, since the flow of ammonia or acid is controlled by means of the size of the holes 50 and 51 in the ammonia manifold 19 and acid manifold 24, respectively, which are both positioned outside of the corrosion zone.

Another advantage of the novel apparatus is that lower conduit sections 37 and 42 do not substantially interfere with rolling action of the solids in the bed. Rolling solids can easily flow past either side of lower conduit sections 37 and 42 without any danger of build-up of solids. However, when a longitudinal distributor of the prior art type is used, large granules frequently build up on top of the distributor and, because of their size, do not pass between the distributor and the shell of the drum. As a result, there is a substantial interference with the flow of solids in the drum, thereby adversely affecting the uniformity of particle size and ammoniation of the resulting granules.

Figure 4 shows a fragmentary elevational view of a preferred form of the novel granulator, combining separate reaction and granulation operations in one unit. Drum 60, having open ends, is fitted with tires 11 and spur gear 12. Drum 60 is mounted on trunnions (not shown) and driven through gear 14 by a suitable motor (not shown). Retaining ring 32 is secured to the feed end of the drum and retaining ring 33 is secured to the discharge end of the drum, each ring being positioned in a plane perpendicular to the longitudinal axis of the drum. Drum 60 is divided into a reaction section 61 and a granulation section 62 by means of retaining ring 63, which is secured to the drum wall in a plane perpendicular to the longitudinal axis of the drum.

The distance between retaining ring 32 and retaining ring 63 is between about ½ and about ¾ of the total distance between retaining ring 32 and 33. Retaining rings 32, 63 and 33 may have openings of equal size, but it is preferred that the area of the opening in each retaining ring increase from the feed end to the discharge end, i.e., the opening in retaining ring 32 is smaller than the opening in retaining rigs 63 and 33.

Feed chute 15 is adapted to receive and convey solid fertilizer components from conveyor 16 to reaction zone 61 of drum 60.

Ammonia manifold 19, which communicates with a suitable ammonia source (such as ammonia conduit 18 of Figure 1), is disposed above the bed of solids in reactor section 61, parallel and adjacent to the longitudinal axis of drum 60. Ammonia manifold 19 extends from the feed end of the drum to a point adjacent to the perpendicular plane containing retaining ring 63. Depending from ammonia manifold 19 and perpendicular thereto are a plurality of ammonia supply conduits 34, positioned parallel to each other at equidistant points along the length of the manifold. Ammonia manifold 19 and ammonia supply conduits 34 are of the same construction as ammonia manifold 19 and ammonia supply conduits 34 respectively, of Figures 2 and 3, and communicate with each other by means of holes 50 (not shown) in the manifold.

Acid manifold 24 which communicates with a suitable acid source (such as conduit 23 of Figure 1), is disposed above the bed of solids in the reaction section 61, parallel and adjacent to ammonia manifold 19. Acid manifold 24 extends from the feed end of the drum to a point adjacent to the perpendicular plane containing retaining ring 63. Depending from acid manifold 24, and perpendicular thereto, are a plurality of acid supply conduits 39 positioned parallel to each other at equidistant points along the length of the acid manifold 24. Acid manifold 24 and acid supply conduits 39 are constructed in the same manner as acid manifold 24 and acid supply conduits 39 respectively, of Figures 2 and 3, and communicate with each other by means of holes 51 (not shown) in the manifold.

Each ammonia supply conduit 34 is preferably positioned adjacent to an acid supply conduit 39, the center lines of each pair of conduits being positioned in the same plane, perpendicular to the longitudinal axis of the drum. Each pair of conduits is secured by means of clamps 44 and support brackets 45 to support member 46. Support member 46 is any suitable channel, beam, or the like secured at one end to A frame 47 and at the other end to A frame 48.

Secured to the interior surface of drum 60 in granulation section 62 are a plurality of strips 64 extending parallel to the longitudinal axis of the drum, which promote rotation and granulation of solid particles in granulation section 62. Strips 64 are preferably square metal rods, having a height and thickness of the order of about ¼" x ¼" respectively, spaced at equidistant points along the circumference of the drum. Construction of strips 64 differs from conventional "lifters" in that the strips do not carry solid particles to a point near the top of the drum, where solids slide off of the lifters and fall through the center of the drum. Instead, as the drum rotates, strips 64 merely carry solids up the side of the drum to a point on a radius of the drum forming an angle equivalent to between about 90° to about 120° with a vertical radius at the bottom of the drum, in the direciton of rotation of the drum. As the strips pass through the bed, a rolling action is imparted to the solids contacting the strips, thereby enhancing the formation of spherical shaped solids in the granulation section and minimizing sliding of solids along the inner surface of the drum.

In a preferred operation of the novel apparatus, solid fertilizer components such as superphosphate, triple superphosphate, potassium chloride, langbeinite, ammonium sulfate, ammonium nitrate and the like are conveyed from storage hoppers in the desired proportions onto conveyor 16 and fed continuously into chute 15. Solids flow by gravity down chute 15 into rotating drum 60. Retaining ring 32 prevents solids from discharging from the feed end of the rotating drum. Retaining ring 63 maintains the bed of solids in reaction section 62 at a depth equal to between about ¼ and about ⅔ the radius of the drum. The bed of solids in the rotating drum assumes the configuration indicated by numeral 49 of Figure 3. The speed of rotation of the drum is sufficient to maintain the inclination of the bed at an angle preferably between about 30° and about 45° with the horizontal. Under these conditions there is a relatively thick lower layer of solids in the bed moving upwardly at a speed slightly less than the peripheral speed of the drum, and a relatively thin upper layer moving downwardly at a substantially greater speed. In this manner solids in the bed are subjected to a thorough mixing and each solid particle is thereby exposed to acid and ammonia-containing fluid a number of times as it progresses from the feed end to the discharge end of the drum.

Ammoniating fluid is fed through conduit 18 at a constant pressure into ammonia manifold 19, where it passes through holes 50 of varying diameter into ammonia supply conduits 34, and then discharges into the bed of solids. Ammoniating fluid leaves each ammonia supply conduit 34 in a ribbon-like stream, a greater proportion of ammonia being released from the conduits positioned in the center of the manifold than from conduits positioned at either end of the ammonia manifold.

Acid is fed through conduit 23, at constant pressure, into acid manifold 24, where it passes through holes 51 of varying diameter into acid supply conduits 39, and then discharges into the bed of solids. Acid leaves each acid supply conduit as a spray preferably in an area adjacent to the discharge end of an ammonia supply conduit 34. When the discharge ends of ammonia supply conduit 34 are positioned adjacent to the discharge end of acid supply conduits 39, ammonia and acid react on the surface of the solids before either the acid or ammonia-containing fluid penetrate to any substantial depth into the solid particles. The reaction between the acid and ammonia-containing fluid causes the formation of an ammonium salt such as ammonium sulfate or ammonium phosphate, or mixtures thereof (depending upon the composition of the acid) on the outer surface of the solids. The heat of reaction is generally sufficient to vaporize a major portion of water present in the reactants.

In addition, the holes 50 in the ammonia manifold 19 are of varying diameter, the holes with the smallest diameter being at each end of the manifold and the holes with the largest diameter being in the center portion of the manifold. For example, when there are six ammonia supply conduits, the diameter of the hole nearest the feed end may be about ¼", the diameter of the next hole may be about 5/16", the diameter of each of the next two holes may be about ⅜", the diameter of the next hole may be about 5/16" and the diameter of the hole nearest the discharge end may be about ¼". The diameter of the orifices in the acid manifold may be ⅛", ⅛", ¼", ¼", 5/16" and 5/16", for each of the acid supply conduits, respectively, extending from the feed end to the discharge end. With orifices of the above-mentioned diameters, the distribution of ammonia in the ammonia supply conduits is 11, 16, 23, 23, 16 and 11% of the total, respectively, in the conduits extending from the feed end to the discharge end. The corresponding acid distribution in the acid supply conduits is 5, 5, 17, 17, 28, and 28%, repectively, in the acid conduits extending from the feed end to the discharge end of the drum. When an ammonia-acid distribution pattern of this type is used, there is a minimum loss of ammonia during the preparation of the fertilizer. There is a relatively high ammonia-to-acid ratio in the area adjacent to the feed end of the drum, since ammonia not only reacts with acid introduced through the acid supply conduits, but also reacts with the acidic phosphate components present in the solid fertilizer components to form ammonium phosphate. As the solids progress through the drum towards the center portion thereof, substantially all of the acidic components initially present in the solid feed are neutralized and the ammonia-acid ratio from the respective conduits is decreased to provide additional acid to react with the ammonia. The ammonia-acid ratio is decreased further near the discharge end of the reactor in order to provide sufficient acid to combine with substantially all of the ammonia introduced through the ammonia supply conduits.

The distribution of either acid or ammonia can be further controlled and varied by removing one or more of the acid supply conduits or ammonia supply conduits, and plugging the corresponding hole 51 or 50, as the case may be. For example, when it is desired to produce a fertilizer having a 1-1-1 ratio, such as a 10-10-10 (percent N-percent $P_2O_5$-percent $K_2O$) fertilizer, the acid supply conduit 39 nearest the feed end of the drum is removed and the corresponding hole 51 is sealed with a suitable plug. The distribution of acid from the other five holes 51 having the above-mentioned diameters is then changed to 5, 18, 19, 29 and 29, respectively, extending from feed end to discharge end of the drum. The ammonia distribution is the same as described above. A distribution pattern of this type prevents over-agglomeration of the solids, which is a troublesome factor in preparing 1-1-1 ratio grades of fertilizer.

When using phosphoric acid in large proportions to prepare fertilizers having a 1-4-4 ratio, for example a composition of 6-24-24, rather than remove an acid supply conduit, the ammonia supply conduit nearest the feed end of the drum is removed and corresponding hole 50 is plugged. The distribution ratio of ammonia from the other five holes 50, having the above-mentioned diameters, is then changed to 18, 26, 26, 18 and 12%, respectively (feed to discharge). A distribution pattern of this type permits the solid fertilizer components to contact the acid before contacting ammonia, thereby providing sufficient acid on the surface of the solids to assure substantially complete reaction of ammonia with the acidic components.

Solid fertilizer components form a bed in the rotating granulator, but each solid particle travels in a continuous curved path approximating a flattened helix extending from the feed end to the discharge end of the drum. As a result, solid particles pass each acid and ammonia supply conduit a number of times, thereby slowly and continuously absorbing acid and ammonia. As a result, an ammonium salt is formed in situ in relatively uniform layers on the surface of the solids, thereby producing fertilizer granules of relatively uniform consistency. Furthermore, substantially all of the ammonia is reacted with acidic components of the fertilizer, and substantially none of the ammonia is lost by volatilization.

Granular solids discharged from the retaining ring 33 may be conveyed to a suitable dryer, such as a rotating dryer, where the moisture content of the granules is reduced to below about 2%. Granules discharged from the dryer may be conveyed by suitable means to a cooling apparatus such as a rotating cooler, where the granules are cooled to a temperature below about 120° F. Cooled granules from the cooler may be conveyed to storage, but are preferably screened to recover an undersize fraction, an oversize fraction, and an on-size product fraction. The product size fraction preferably has a particle size of between about 6 and about 14 mesh, but the size of the product fraction may be varied as desired. The oversize fraction is comminuted and recycled to the screens. The undersize fraction is recycled to feed chute 15.

The following example is presented to further illustrate the instant invention without any intention to be limited thereby. All parts and percentages are by weight unless otherwise specified.

*Example*

A 6–24–24 (percent N–percent $P_2O_5$–percent $K_2O$) granular fertilizer was prepared in a novel rotary granulator of the design set forth in Figure 4. The novel granulator had a diameter of 7 feet and a length of 14 feet. The granulator was divided into a reaction zone and granulation zone by means of a retaining ring positioned perpendicular to the longitudinal axis at a point about 8 feet from the feed end of the drum. The height of the retaining ring at the feed end of the drum was 22", the height of the central retaining ring was 12", and the height of the retaining ring at the discharge end of the drum was 3". The drum sloped about ½"/foot downward from the feed end to the discharge end.

Solid fertilizer components were fed from separate storage hoppers, through a weighing apparatus positioned at the end of each storage hopper, into a screw conveyor. Solids were discharged from the conveyor into a bucket elevator and conveyed down a chute secured to the bucket elevator into the feed end of the drum. Solid fertilizer components fed to the drum and the rate of feed of each component were as follows:

| Component: | Rate of feed, lbs./hour |
|---|---|
| Triple superphosphate (46% $P_2O_5$) | 5390 |
| Superphosphate (20% $P_2O_5$) | 2280 |
| Muriate of potash (60% $K_2O$) | 7850 |
| Langbeinite (22.5% $K_2O$, 18.6% MgO) | 750 |

Anhydrous ammonia at the rate of 1530 pounds per hour was fed under constant pressure from the storage tank through suitable piping means to the ammonia manifold positioned in the drum. The ammonia piping means was provided with a meter for measuring the flow of anhydrous ammonia. Water was introduced into the ammonia piping means at the rate of about 100 pounds per hour through a water line communicating, by means of a T fitting, with the ammonia piping means. Ammonia vapors were absorbed by the water, and the resulting aqueous ammonia solution was conveyed to the ammonia manifold. The ammonia manifold had an inside diameter of about 2" and a length of about 7 feet. Positioned in a straight line on the underside of the ammonia manifold were 6 holes in a series, spaced about 12" apart along the manifold. The diameter of the holes, extending from the feed end to the central retaining ring were ¼", ⁵⁄₁₆", ⅜", ⅜", ⁵⁄₁₆", ¼", respectively. The hole nearest the feed end of the drum was sealed with a plug.

Ammonia supply conduits were secured to the underside of the ammonia manifold and positioned to communicate with each of the five open holes, the longitudinal axis of each ammonia supply conduit coinciding with the longitudinal axis of one of the holes. Each ammonia supply conduit was comprised of a flange, an upper conduit section, a coupling, and a lower conduit section. Each flange was secured to the underside of the ammonia manifold by welding and communicated with the upper end of an upper conduit section by means of a threaded connection. The lower end of each upper conduit section communicated with the upper end of a lower conduit section by means of a threaded coupling. The lower end of lower conduit section was formed into the shape of a "fish tail," as shown in Figure 3, to permit ammonia to be discharged into the bed of solids in a ribbon-like stream. The ammonia manifold, flanges, upper conduit sections and couplings were constructed of Type A.I.S.I. 304 stainless steel. The lower conduit sections were constructed of mild steel. The diameter of each ammonia supply conduit above the "fish tail" was about ¾", and the overall length was about 28". The longitudinal axis of each ammonia supply conduit was perpendicular to the ammonia manifold and formed an angle of about 45° with a vertical diameter of the ammonia manifold.

Phosphoric acid having a concentration of about 54% $P_2O_5$ was pumped from the storage tank through suitable piping means at the rate of 3500 pounds of $H_3PO_4$/hour to the acid manifold positioned adjacent to the ammonia manifold in the drum. The acid manifold had an inside diameter of about 1" and a length of about 7 feet. Positioned in a straight line on the underside of the acid manifold were 6 holes in a series, spaced about 12" apart along the length of the manifold. The diameter of the holes, extending from the feed end of the drum to the central retaining ring, were ⅛", ⅛", ¼", ¼", ⁵⁄₁₆", ⁵⁄₁₆", respectively.

Acid supply conduits were secured to the underside of the acid manifold and positioned to communicate with each of the holes, the longitudinal axis of each acid supply conduit coinciding with the longitudinal axis of one of the holes. Each acid supply conduit was comprised of a flange, an upper conduit section, a coupling and a lower conduit section. Each flange was secured to the underside of the acid manifold by welding, and communicated with the upper end of an upper conduit section by means of a threaded connection. The lower end of each upper conduit section communicated with the upper end of a lower conduit section by means of a threaded coupling. The acid supply conduit nearest the feed end of the drum was positioned adjacent to the sealed hole in the ammonia manifold. The lower end of each lower conduit section of the other five acid supply conduits was positioned about 1" above a "fish tail" discharge end of a corresponding ammonia supply conduit. The acid manifold, flanges, upper conduit sections and couplings were constructed of A.I.S.I. Type 304 stainless steel. The lower conduit sections were constructed of mild steel. The diameter of each acid supply conduit was about ½", and the overall length was about 22". The longitudinal axis of each acid supply conduit was substantially vertical and perpendicular to the longitudinal axis of the acid manifold.

Each ammonia supply conduit and each acid supply conduit were secured by means of clamps to a support bracket depending from a support channel extending throughout the drum parallel to the longitudinal axis thereof. Each end of the channel was secured to a supporting A frame positioned at the extremities of each end of the drum. Communicating with the discharge end of the drum was a hood and ventilating system provided with a blower to remove gases from the drum.

Water was conveyed through suitable piping means to the granulation section of the drum and sprayed onto the surface of the tumbling bed of solids at the rate of about 100 pounds per hour. Solids discharged from the granulation section of the drum were conveyed to an oiler-fired dryer. Combustion gases flowed concurrently with the solids through the dryer, and were introduced at a temperature of about 900° F., and discharged at a temperature of about 220° F. Solids were discharged from the dryer at a temperature of about 170° F., and then conveyed to a rotating cooler wherein air was fed countercurrent to the flow of solids. Solids were discharged from the cooler at a temperature of about 110° F. and conveyed to a double-deck shaking screen where a product fraction having a mesh size between —6 and +14 mesh was recovered. About 92% of the solids fed to the screen were recovered in the product fraction. Chemical analyses of the product fraction were as follows:

| Component: | Proportion, percent |
|---|---|
| N | 6.02 |
| $P_2O_5$ | 23.94 |
| $K_2O$ | 24.06 |

Oversize solids from the screen were comminuted and recycled to the screens. Undersize solids from the screen were recycled through the feed end of the rotating drum. Ammonia loss by volatilization was about 4.3% by weight.

For purposes of comparison, a similar apparatus was used to prepare a 5–20–20 (percent N–percent $P_2O_5$–percent $K_2O$) fertilizer. The ammonia manifold contained 5 holes, each having a diameter of ¼". The acid manifold had five holes, each having a diameter of ⅛"; the hole nearest the feed end of the drum was sealed with a plug.

Components used to prepare the fertilizer and the rate of feed of each component were as follows:

| Component: | Rate of feed, pounds per hour |
|---|---|
| Triple superphosphate | 8450 |
| Superphosphate | 880 |
| Muriate of potash | 663 |
| Dolomite | 720 |
| Anhydrous ammonia | 1270 |
| Sulfuric acid (66° Bé.) | 2650 |

Chemical analyses of the product were as follows:

| Component: | Proportion, percent |
|---|---|
| Nitrogen | 4.64 |
| $P_2O_5$ | 20.05 |
| $K_2O$ | 19.95 |

Ammonia loss by volatilization was about 11.28%.

Having now thus fully described the invention, what is desired to be secured by Letters Patent is:

1. In an apparatus for the preparation of granular ammonia-containing fertilizer comprising in combination a rotary cylindrical drum having open ends, two retaining rings singly disposed at the ends of the drum and along the axis thereof, a stationary ammonia manifold disposed within the drum adjacent to and parallel to the longitudinal axis thereof, said ammonia manifold being closed at one end and communicating at the other end with a valved conduit adapted to introduce ammonia-containing fluid into the ammonia manifold at a controlled rate, a stationary acid manifold disposed within the drum adjacent and parallel to the ammonia manifold, said acid manifold being closed at one end and communicating at the other end with a valved conduit adapted to introduce acid into the acid manifold at a controlled rate, said ammonia manifold and said acid manifold each having a length substantially equal to the length of the drum between the retaining rings, and means for passing a current of air through the drum, the improvement which comprises an ammonia manifold provided with a series of orifices on the underside thereof, each orifice being positioned substantially equidistant from adjacent orifices, the area of orifices in the central portion of the ammonia manifold being larger than the area of the orifices in each end portion of the ammonia manifold, a series of ammonia supply conduits depending from the ammonia manifold positioned perpendicular to the ammonia manifold and parallel to each other, the longitudinal axis of each ammonia supply conduit forming an angle of between about 30 and about 60° with a vertical diameter of the ammonia manifold, one end of each ammonia supply conduit communicating with an orifice in the ammonia manifold, the opposite end of each ammonia supply conduit being open and positioned adjacent to the inner wall of the drum, said opening being positioned substantially in the direction of rotation of the drum, an acid manifold provided with a series of orifices on the underside thereof, each orifice being positioned substantially equidistant from adjacent orifices, the area of said orifices increasing from the feed end of said drum to the discharge end of said drum, a series of acid supply conduits depending from the acid manifold positioned perpendicular to the acid manifold and parallel to each other, one end of each acid supply conduit communicating with an orifice in the acid manifold, the opposite end of each acid supply conduit being open and positioned adjacent and above the open end of an ammonia supply conduit.

2. The improved apparatus of claim 1 wherein each ammonia supply conduit is comprised of a flange, an upper conduit section, a coupling and a lower conduit section, said flange communicating at its face with an orifice in said ammonia manifold and communicating at the opposite end with the upper end of an upper conduit section, the lower end of said upper conduit section communicating with a coupling by means of threaded connections, said coupling communicating by means of threaded connections with the upper end of a lower conduit section, the longitudinal axis of said orifice, said flange, said upper conduit section, said coupling and said lower conduit section being positioned in the same straight line.

3. The improved apparatus of claim 1 wherein each acid supply conduit is comprised of a flange, an upper conduit section, a coupling, and a lower conduit section, said flange communicating at its face with an orifice in said acid manifold and communicating at the opposite end with the upper end of an upper conduit section, the lower end of said upper conduit section communicating with a coupling by means of threaded connections, said coupling communicating by means of threaded connections with the upper end of a lower conduit section, the longitudinal axis of said orifice, said flange, said upper conduit section, said coupling, and said lower conduit section being positioned in the same straight line.

4. The improved apparatus of claim 1 wherein the number of ammonia supply conduits exceeds the number of acid supply conduits by one, said additional ammonia supply conduit being positioned substantially midway between the retaining ring at the feed end of the drum and the adjacent ammonia supply conduit.

5. The improved apparatus of claim 1 wherein the number of acid supply conduits exceeds the number of ammonia supply conduits by one, said additional acid supply conduit being positioned substantially midway between the retaining ring at the feed end of the drum and the adjacent acid supply conduit.

6. An apparatus for the preparation of granular ammonia-containing fertilizer comprising in combination a rotary cylindrical drum having open ends, two retaining rings singly disposed at the ends of the drum and along the axis thereof, said drum being divided into a reaction zone and a granulation zone by means of a third retaining ring positioned parallel to the other two retaining rings at a point between about one-half and about three-quarters of the distance from the feed end of the drum, said reaction zone being the zone adajacent the feed end of the drum, said granulation zone being adjacent to the discharge end of the drum, a stationary ammonia manifold disposed within the drum adjacent to and parallel to the longitudinal axis thereof, said ammonia manifold having a length substantially equal to the length of the drum comprising the reaction zone, said ammonia manifold being closed at one end and communicating at the other end with a valved conduit adapted to introduce ammonia-containing fluid into the ammonia manifold at a controlled rate, said ammonia manifold being provided with a series of orifices on the underside thereof, each orifice being positioned substantially equidistant from adjacent orifices, the area of orifices in the central portion of the ammonia manifold being larger than the area of the orifices in each end portion of the ammonia manifold, a series of ammonia supply conduits depending from the ammonia manifold positioned perpendicular to the ammonia manifold and parallel to each other, the longitudinal axis of each ammonia manifold supply conduit forming an angle of between about 30 and about 60° with a vertical diameter of the ammonia manifold, one end of each ammonia supply conduit communicating with an orifice in the ammonia manifold, the opposite end of each ammonia supply conduit being open and positioned adjacent to the inner wall of the drum, said opening being positioned substantially in the direction of the rotation of the drum, a stationary acid manifold disposed within the drum adjacent to and parallel to said ammonia manifold, said acid manifold having a length substantially equal to the length of the drum comprising the reaction zone, said acid manifold being closed at one end and communicating at the other end with a valved conduit adapted to introduce acid into the acid manifold at a controlled rate, said acid manifold being provided with a series of orifices on the underside thereof, each orifice being positioned substantially equidistant from adjacent orifices, the area of orifices increasing from the feed end of the drum to the central retaining ring, a series of acid supply conduits depending from the acid manifold positioned perpendicular to the acid manifold and parallel to each other, one end of each acid supply conduit communicating with an orifice in the acid manifold, the opposite end of each acid supply conduit being open and positioned adjacent to and above the opening of an ammonia supply conduit, means for passing a current of air through the drum, and means for spraying water into said granulation zone.

7. The apparatus of claim 6 wherein the number of ammonia supply conduits exceeds the number of acid supply conduits by one, said additional ammonia supply conduit being positioned substantially midway between the retaining ring at the feed end of the drum and the adjacent ammonia supply conduit.

8. The apparatus of claim 6 wherein the number of acid supply conduits exceeds the number of ammonia supply conduits by one, said additional acid supply conduit being positioned substantially midway between the retaining ring at the feed end of the drum and the adjacent acid supply conduit.

9. The apparatus of claim 6 wherein the total area of said orifices on the underside of said ammonia manifold is less than one-half the cross-sectional area of said ammonia manifold, and the total area of said orifices on the underside of said acid manifold is less than one-half the cross-sectional area of said acid manifold.

References Cited in the file of this patent
UNITED STATES PATENTS

| | | |
|---|---|---|
| 814,430 | Coleman | Mar. 6, 1906 |
| 2,741,545 | Nielsson | Apr. 10, 1956 |